(12) United States Patent
Donham et al.

(10) Patent No.: US 7,825,935 B1
(45) Date of Patent: Nov. 2, 2010

(54) SYSTEM, METHOD AND COMPUTER PROGRAM PRODUCT FOR USING TEXTURES AS INSTRUCTIONS FOR GRAPHICS PROCESSING

(75) Inventors: Christopher D. S. Donham, San Mateo, CA (US); Edward Hutchins, Mountain View, CA (US); Alexander Minkin, Los Altos, CA (US); George E. Scott, III, Dublin, CA (US)

(73) Assignee: NVIDIA Corporation, Santa Clara, CA (US)

( * ) Notice: Subject to any disclaimer, the term of this patent is extended or adjusted under 35 U.S.C. 154(b) by 309 days.

(21) Appl. No.: 10/006,551

(22) Filed: Nov. 30, 2001

(51) Int. Cl.
*G09G 5/00* (2006.01)
(52) U.S. Cl. ............... 345/582; 345/583; 345/552; 345/553; 345/545; 345/547
(58) Field of Classification Search ........... 345/582, 345/506, 545, 557
See application file for complete search history.

(56) References Cited

U.S. PATENT DOCUMENTS

| | | | | |
|---|---|---|---|---|
| 5,051,940 A | * | 9/1991 | Vassiliadis et al. | 708/524 |
| 5,497,496 A | * | 3/1996 | Ando | 712/23 |
| 5,767,856 A | * | 6/1998 | Peterson et al. | 345/422 |
| 5,826,089 A | * | 10/1998 | Ireton | 717/146 |
| 5,831,640 A | * | 11/1998 | Wang et al. | 345/552 |
| 5,987,567 A | * | 11/1999 | Rivard et al. | 345/552 |
| 6,181,346 B1 | * | 1/2001 | Ono et al. | 345/582 |
| 6,426,753 B1 | * | 7/2002 | Migdal | 345/506 |
| 6,975,321 B1 | * | 12/2005 | Lindholm et al. | 345/506 |
| 7,038,678 B2 | * | 5/2006 | Bunnell | 345/426 |
| 2002/0101427 A1 | * | 8/2002 | Nguyen et al. | 345/531 |

FOREIGN PATENT DOCUMENTS

EP 862112 A2 * 9/1998
WO WO 9638783 A1 * 12/1996

OTHER PUBLICATIONS definition of instruction from dictionary.com: http://dictionary.reference.com/browse/instruction.*

* cited by examiner

*Primary Examiner*—Kee M Tung
*Assistant Examiner*—Jwalant Amin
(74) *Attorney, Agent, or Firm*—Zilka-Kotab, PC (57) ABSTRACT

A system, method and computer program product are provided for retrieving instructions from memory utilizing a texture module in a graphics pipeline. During use, an instruction request is sent to memory utilizing a texture module in a graphics pipeline. In response thereto, instructions are received from the memory in response to the instruction request utilizing the texture module in the graphics pipeline.

32 Claims, 9 Drawing Sheets

Figure 1

(Prior Art)

SYSTEM, METHOD AND COMPUTER PROGRAM PRODUCT FOR USING TEXTURES AS INSTRUCTIONS FOR GRAPHICS PROCESSING

FIELD OF THE INVENTION

The present invention relates to computer graphics, and more particularly to texture mapping in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, a triangle, a line or a point. All graphic pictures are formed with combinations of these graphic primitives. Many procedures may be utilized to perform graphic primitive rendering.

Early graphic systems displayed images representing objects using just colored polygons. That is, textures, bumps, scratches, or other surface features were very expensive to model because they had to be drawn with individual polygons. In order to improve the quality of the image, texture mapping was developed to model the complexity of real world surface images. In general, texture mapping is the mapping of an image or a function onto a surface. Texture mapping is a relatively efficient technique for creating the appearance of a complex image without the tedium and the high computational cost of rendering the actual three dimensional detail that might be found on a surface of an object.

Figure 1:
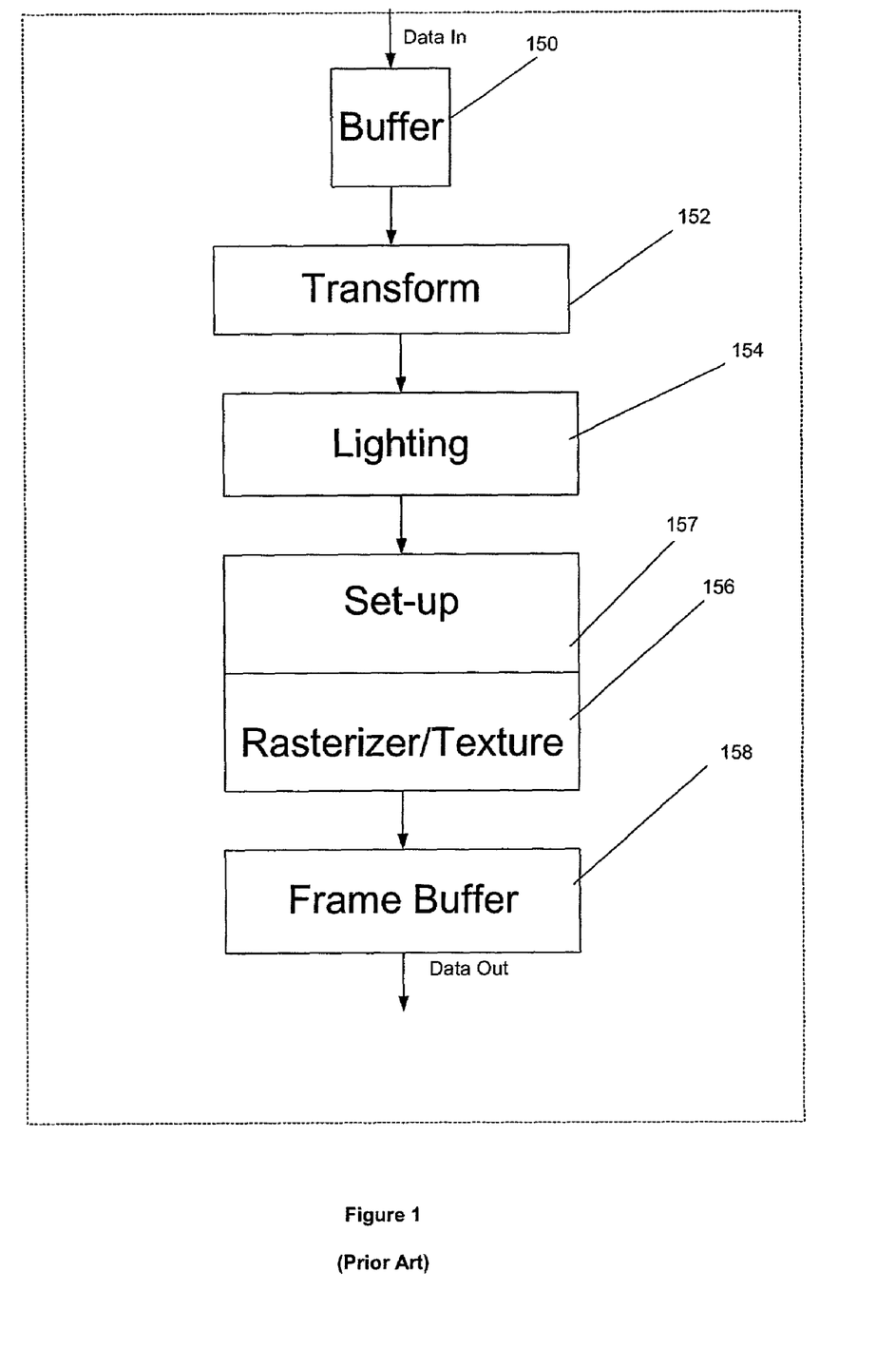
FIG. 1 illustrates a graphics pipeline with which texture mapping may be performed.

Prior Art FIG. 1 illustrates a graphics pipeline with which texture mapping may be performed. As shown, the present embodiment may be divided into a plurality of modules including a buffer 150, a transform module 152, a lighting module 154, a rasterization/texture module 156 with a set-up module 157, and a frame buffer 158.

During operation, the buffer 150 is used for gathering and maintaining a plurality of vertex attribute states such as position, normal, colors, texture coordinates, etc. Completed vertices are processed by the transform module 152 and then sent to the lighting module 154. Typically, the transform module 152 is used to map vectors from an object coordinate space into the screen coordinate space. The lighting module 154 calculates the surface color at the vertex based on the surface normals and material properties.

The output of the lighting module 154 is screen space data suitable for the set-up module 157, which, in turn, calculates primitive extents. Thereafter, rasterization/texture module 156 iterates through all of the pixels contained within the primitive and maps any required textures onto the primitive. The output of the rasterization/texture module 156 is then sent to a frame buffer 158 for storage prior to being output to a display device (not shown).

Figure 2:
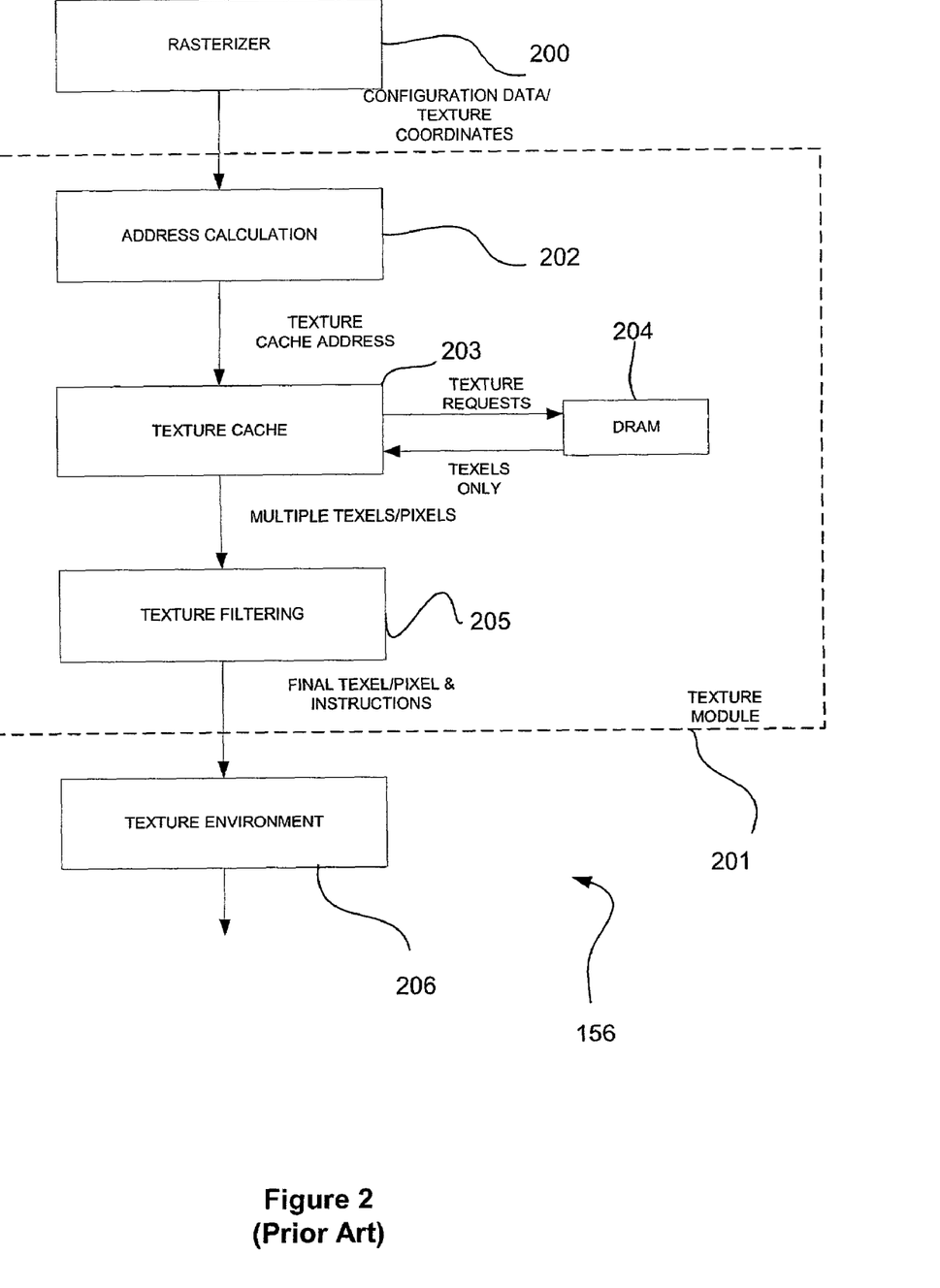
FIGS. 2 and 3 are more detailed diagrams of the rasterization/texture module of FIG. 1, in accordance with the prior art.

Prior Art FIG. 2 illustrates the rasterization/texture module 156, in accordance with the prior art. The rasterizer 200 passes configuration data for control registers to the texture module 201. In response to the receipt of configuration data, the texture module 201 is configured to operate in a particular mode as will be described shortly. This configuration data is also passed to the texture environment module 206. The rasterizer 200 also generates texture coordinates for all of the pixels that comprise a primitive. In response to the receipt of such texture coordinates, the texture module 201 is adapted to calculate texture cache addresses utilizing an address calculation module 202. Such texture cache addresses may be then utilized for looking up corresponding textures in the form of texels from memory 204 utilizing a texture cache 203. Upon receipt of a texture cache address, the texture cache 203 outputs the associated texels to the texture filtering module 205 if the texels are already present inside the texture cache 203. If the associated texels are not present in the texture cache 203, texture requests are sent to the memory 204. In response to the texture requests, the memory 204 will send the associated texels to the texture cache 203. The texture cache 203 retains a copy of the texels so that future requests for the same texels may be serviced without requiring accesses to the memory 204, and sends the texels on to the texture filtering module 205. Based on the current configuration, and in response to the receipt of texels from the texture cache 203, the texture filtering module 205 adapts texels to map to pixels associated with the primitives.

The texture environment module 206 is configured by the configuration data from the texture module 201. The filtered texels from the texture filtering unit 205 are blended by the texture environment module 206 with other pixel data (such as other, previously referenced textures). Once all texture blending operations are completed, the pixel data is passed on to the frame buffer (not shown).

As mentioned above, each of the components in the texture module 201 may operate in various "states" or "modes." By this design, the components of the texture module 201 may process the texels in various ways for each subject pixel. For example, the address calculation module 202 may allow various dimensionality textures (i.e. 1-D, 2-D, 3-D, etc), and may calculate addresses for textures of various sizes (i.e. width, height, depth, etc.). Moreover, the address calculation module 202 and texture cache 203 may handle different texel formats (i.e. 8 bit texels, 16 bit texels, DXT compressed texels, palettized texels, etc). Additionally, the address calculation module 202 may support different methods for accommodating requests for texels beyond the defined texture size (i.e. wrapping, clamping, border colors, etc). Still yet, each of the components in the texture module 201 may operate in different filtering modes (i.e. no filtering, bilinear filtering, trilinear filtering, anisotropic filtering, etc). These examples are typical for a texture module 201, but do not represent a necessary or complete list of modes or states. Of course, any combination of features may be enabled, disabled, and/or altered based on a particular mode of operation.

Because of the amount of configuration data required to initialize the state of the texture module 201, a typical system allows programmed combinations of states to be created. Further, an exemplary system may allow these programmed combinations of states to be referenced via a "texture ID". In such a system, configuration data may be used to establish the state (e.g., a particular dimensionality, a particular size, a particular texel format, etc) for a given texture ID (e.g. texture ID 0). Then, further configuration data may be used to establish the state for another texture ID (e.g. texture ID 1). In such a system, the rasterizer 200 may then provide a texture ID with the texture coordinates. For example, one primitive may use texture ID 0, a subsequent primitive may use texture ID 1, and so on. If a primitive again requires texture ID 0, it may not be necessary to resend any additional configuration information since this texture ID was previously configured. In this way, multiple primitives with differing texture modes could be referenced with minimal reprogramming of configuration data. Not all texture modules 201 support texture ID's; texture ID's are merely one method that has been used to try to minimize the amount of configuration data which must be programmed.

Figure 3:
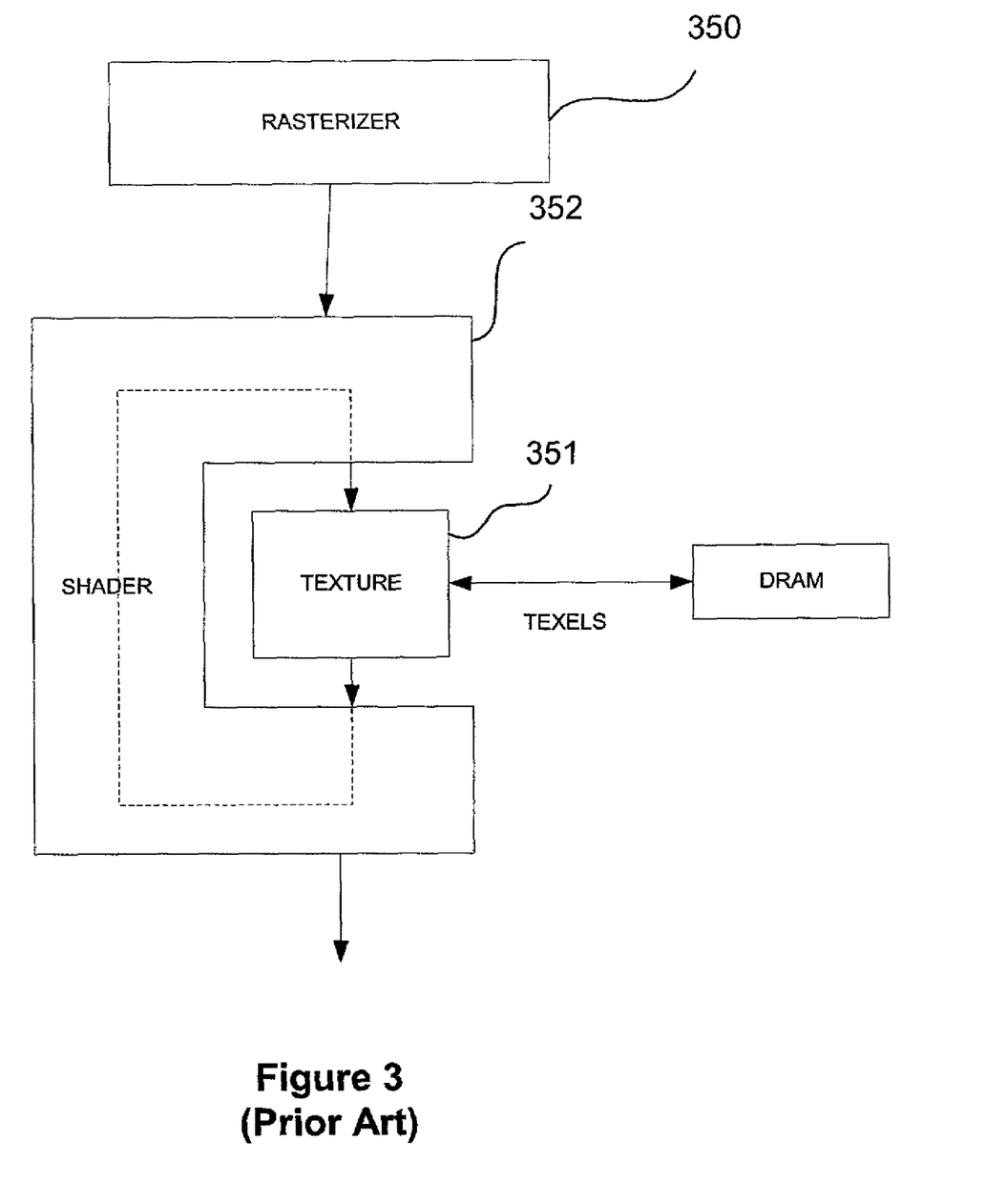

In recent prior art, the texture environment 206 has been replaced with pixel shading hardware. Prior Art FIG. 3 illustrates an example of a modern, high performance system. The rasterizer 200 and texture module 201 still exist in the high performance system (see rasterizer 350 and texture module 351). However, the texture environment module has been replaced with a shader module 352. One of the key advantages of this architecture is that processing for a primitive can "loop" (i.e. the texels resulting from one texture lookup can influence the location of the texels in a subsequent texture lookup). In particular, the processing can loop many times and use a variety of math operations to blend texture and color data, and to compute new texture coordinates, allowing a much more complicated and visually rich resulting image than was available with the architecture in Prior Art FIG. 2. The configuration data which controls this looping and the associated math operations is typically referred to as a "shader program" since it bears a resemblance to a "program" such as a general purpose computer would execute.

With the expanding options enabled by the architecture in Prior Art FIG. 3, there is an associated increase in the amount of configuration data required to achieve a desired effect. Even in systems utilizing texture ID's as described above, the amount of configuration data required to configure the texture ID's and shader program can require a significant amount of time to push down the pipeline through the texture module 351 and the shader 352. Thus, there is a need to accommodate the programmability of recent texture and shader modules without being inhibited by the size of associated programs.

DISCLOSURE OF THE INVENTION

A system, method and computer program product are provided for retrieving instructions from memory utilizing a texture module in a graphics pipeline. During use, an instruction request is sent to memory utilizing a texture module in a graphics pipeline. In response to the instruction request, instructions are received from the memory utilizing the texture module in the graphics pipeline.

As an option, a texture request is also sent to memory utilizing the texture module in the graphics pipeline. In response to the texture request, texture information is received from the memory utilizing the texture module. It should be noted that the instruction request may precede or follow the texture request in any desired order or quantity, and visa-versa.

In one embodiment, the memory may include a frame buffer. Moreover, the memory may include direct random access memory (DRAM).

In another embodiment, the instructions may be adapted for controlling a texture environment module coupled to the texture module. Such instructions may control the manner in which the texture environment module processes the texture information.

In still another embodiment, initial instructions may be received from a rasterizer module coupled to the texture module. Such initial instructions may control the sending of the requests by the texture module, the aforementioned processing, and/or the lack thereof.

In still yet another embodiment, the texture module may operate in a plurality of different modes. As an option, the instructions may be requested and received in a predetermined mode. Such predetermined mode may be designed to prevent any processing or manipulation of the instructions.

As an option, the instructions and the texture information may be temporarily stored in cache. Such cache may be resident on the texture module.

Further, the texture module may be controlled by utilizing a shader module coupled thereto. Such shader module may control the sending of the instruction request and the texture request by the texture module. Further, the shader module may use the data resulting from an instruction request as configuration data or instructions. Further, the shader module may process a plurality of pixels with the texture information based on the instructions. Optionally, the processing may be ceased upon the receipt of a terminate instruction. The shader module may also be capable of reusing the instructions and texture information in order to request further instructions and texture information from the memory.

In still another embodiment, a complete instruction set may be received in response to the instruction request. In the alternative, a partial instruction set may be received in response to the instruction request, after which more instruction sets are requested and received.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

DESCRIPTION OF THE PREFERRED EMBODIMENTS

Figure 3A:
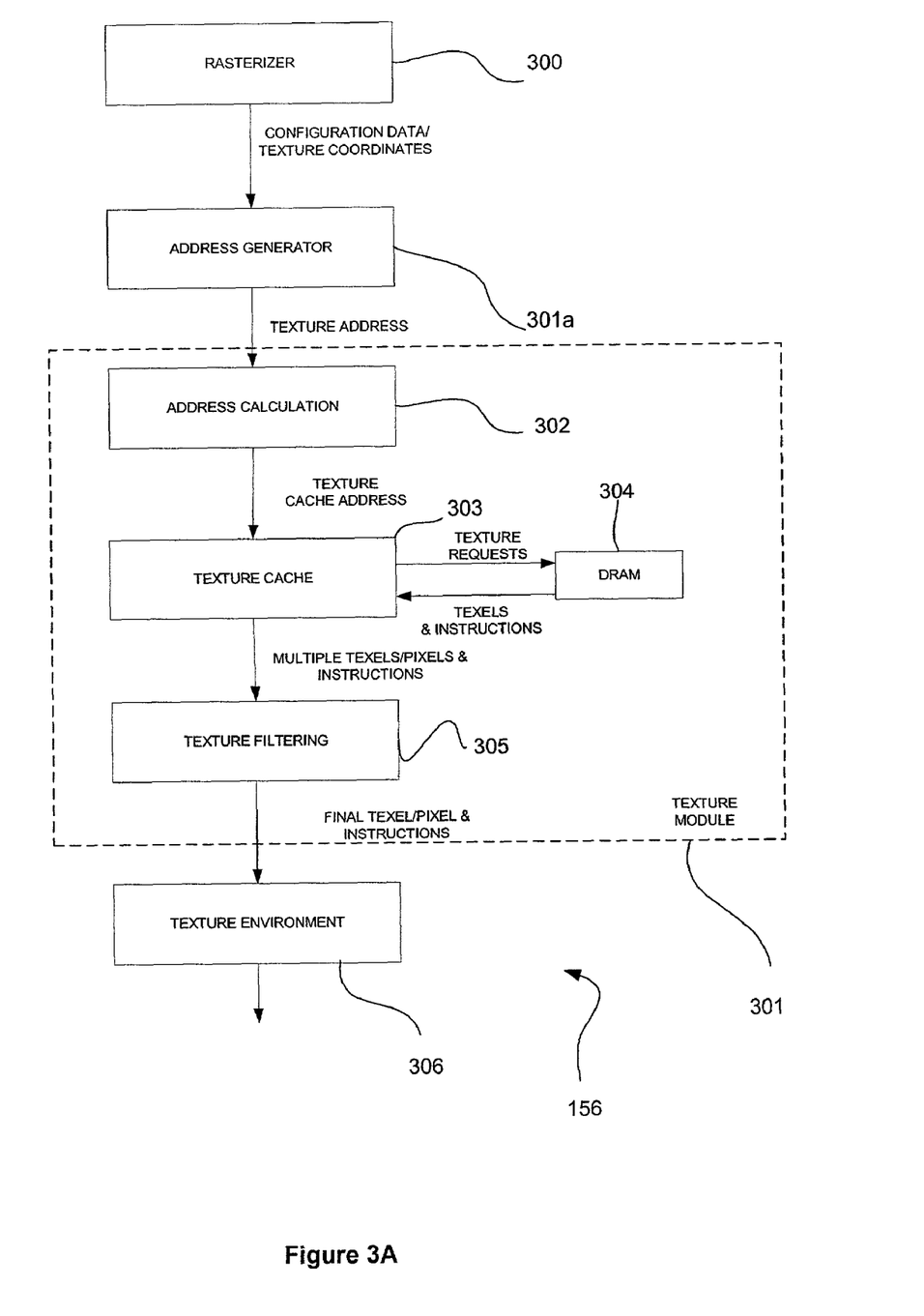
FIG. 3A illustrates a rasterization/texture module capable of looking up instructions, in accordance with one embodiment.

Prior Art FIGS. 1-3 show the prior art. FIG. 3A illustrates a rasterization/texture module 300/301 capable of looking up instructions, in accordance with one embodiment. It should be noted that such rasterization/texture module 300/301 may be implemented in the context of a graphics pipeline like that shown in prior art FIG. 1, or any other desired framework.

Some exemplary differences between the systems of FIG. 2 and FIG. 3A include the addition of an address generator 301a and the manner in which texel data may be used by the texture module 301 and texture environment module 306. These differences will be described in greater detail below. It should be noted that the present embodiment may also be used in the context of a modern, high performance system as was described previously (see FIG. 3 and associated text). More information regarding such embodiment will be set forth during reference to FIG. 6. Of course, the principles set forth herein may be employed in any desired context.

The address generator 301a is used to convert instruction requests from the rasterizer 300 into pseudo texture coordinates for the texture module 301. These pseudo texture coordinates are processed by the texture module 301 in the same manner as has been previously describe for texture coordinates in a conventional system. In particular, an address calculation module 302 computes texture cache addresses for the pseudo texture coordinates based on mode and state information.

A texture cache 303 returns the pseudo-texel data if the data for the texture cache address is in cache memory. Otherwise, the texture cache 303 requests the associated data from memory 304, and upon receipt of the pseudo-texel data from the memory 304, stores this data in local memory and outputs this data to a texture filter module 305. The texture filtering module 305 processes pseudo-texel data in accordance with state and mode information, and outputs the pseudo-texel data to a texture environment module 306.

It should be noted, however, that the pseudo-texel data is not necessarily mapped onto a primitive, and does not necessarily represent conventional visual data (i.e. color data). Instead, the pseudo-texel data may represent instructions (i.e. control information, configuration data, etc.) for the graphics pipeline. By this design, the address generator 301a may be used in combination with the texture module 301 to implement a high bandwidth source for such instructions.

When the texture referenced by a texture coordinate contains instructions rather than visual data, the texture may be referred to as an "instruction texture". In one particular embodiment, the instruction texture may contain just configuration data. In this embodiment, the rasterization module 300 sends requests for instructions to the address generator 301a. In response to receiving the instruction request, the address generator 301a outputs pseudo texture coordinates which are processed in the same manner as normal texture coordinates as described previously. The resulting texel data may then be interpreted as instructions (i.e. control information, configuration data, etc.) by the texture environment module 306 for any subsequent graphics primitives that are processed.

In the context of the present description, instructions may refer to computer code, configuration data, or any type of control signals capable of controlling graphics processing involving the texels, pixels, and/or primitives, etc. It should be noted that such instructions may be components of a program that may be downloaded to the memory 304 by a host processor at any time prior to the retrieval thereof.

By retrieving the instructions from the memory 304 utilizing the texture module 301, much pipeline bandwidth is saved at the input of the texture module 301 since the prior art configuration data need not be received from the rasterizer 300. Moreover, the memory 304 traditionally employs a high-bandwidth connection with the texture module 301, which may be used for efficient retrieval of the instructions. The instructions may then be used by the texture module 301 and subsequent modules in order to control various graphics processing involving the texels, pixels, and/or primitives, etc. For example, the instructions may control how subsequent texels may be mapped to pixels associated with the primitives utilizing the texture filtering module 305. Moreover, the instructions may be passed to a texture environment module 306 along with the texels. As such, the instructions may further be used by the texture environment module 306 in order to control the mapping, or blending, of the texels with the pixels, in accordance with the instructions.

Figure 4:
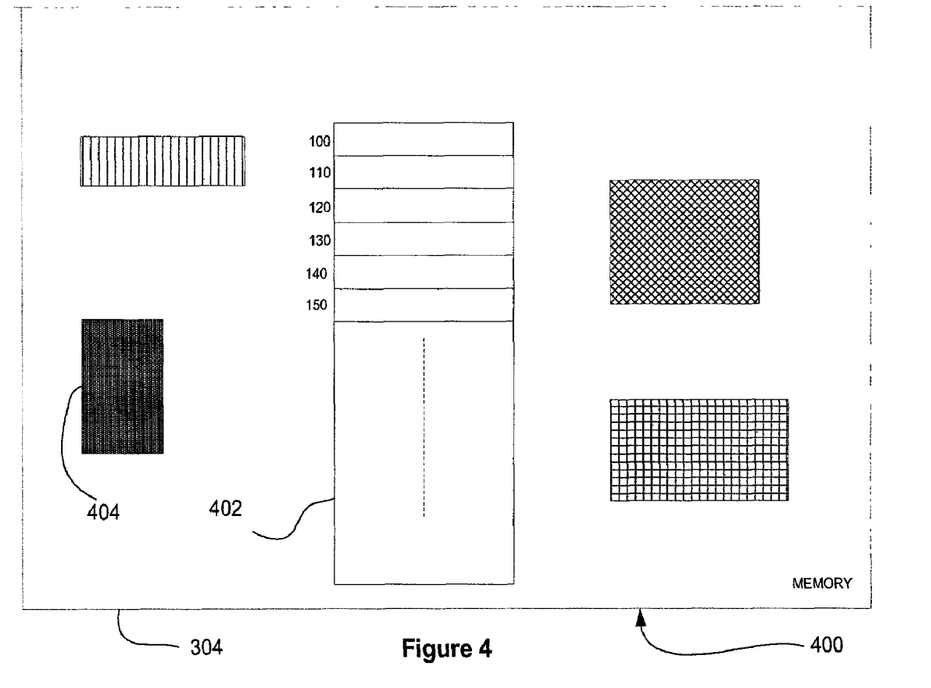
FIG. 4 illustrates a data structure that may be stored in memory for allowing the retrieval of instructions utilizing a texture module coupled thereto.

FIG. 4 illustrates a data structure 400 that may be stored in the memory 304 for allowing the retrieval of instructions utilizing the texture module 301 coupled thereto. As is abstractly shown in FIG. 4, an instruction texture 402 is stored in the memory 304 for being retrieved therefrom in response to an instruction request utilizing the texture module 301.

Optionally, a texture object 404 including texture information is stored in the memory 304 for being retrieved therefrom in response to a texture request utilizing the texture module 301.

It should be noted that the texture module 301 need not necessarily discern between the requests for instructions and texture information, and the instructions and texture information themselves. In other words, the texture module 301 may retrieve the instructions as if they were texture information, and visa-versa. As such, the texture module 301 may not be able to differentiate between the texture information and instructions that are stored in the memory 304. It may thus be by the "convenience of interpretation" that the texels fetched by the texture module 301 utilizing the paths designed for color texture data may in fact be utilized as instructions. Of course, various modifications may be made to the hardware itself to differentiate between the texture information and instructions for optimization purposes, etc.

The instruction textures 402 may also be sized in any desired manner to allow the convenient storage and retrieval of the instruction objects 402 as if they were texture objects 404. For example, if instructions passed down the pipeline from the host are 32 bits, it may be convenient to use 1-D, 32 bit texel data to store instruction textures. As mentioned previously, the retrieval of instruction textures may be facilitated by configuring the texture module 301 to use point sampling/ no filtering so that the instructions are not modified by the texture filtering module 305.

Figure 5:
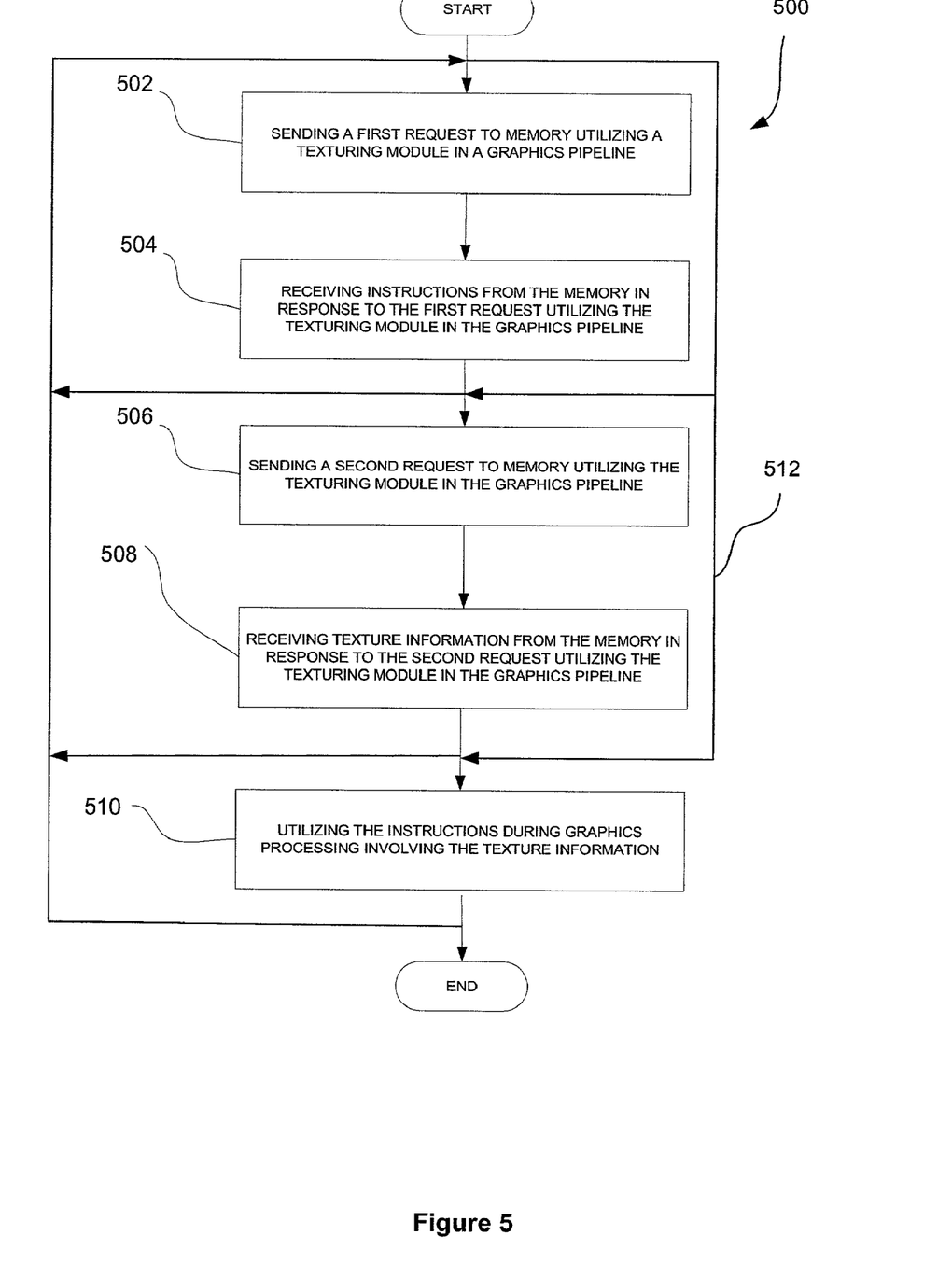
FIG. 5 illustrates a method for retrieving instructions from memory utilizing a texture module in a graphics pipeline.

FIG. 5 illustrates a method 500 for retrieving instructions from the memory 304 utilizing the texture module 301 in a graphics pipeline. Initially, in operation 502, an instruction request is sent to the memory 304 utilizing the texture module 301. Next, in operation 504, instructions are received from the memory 304 in response to the instruction request utilizing the texture module 301.

As an option, a complete instruction set may be received in response to the instruction request. In the alternative, a partial instruction set may be received in response to the instruction request. In such embodiment, partial instruction sets may be repeatedly retrieved. In either approach, it may be useful to retrieve multiple instructions at a time so that optimizations which combine, modify, or delete instructions can be performed.

In operation 506, a texture request is also sent to memory 304 utilizing the texture module 301 in the graphics pipeline. In response to the texture request, texture information is received from the memory 304 utilizing the texture module 301 in operation 508. It should be noted that the texture requests are optional. Further, the instruction request may precede or follow the texture request in any desired order or number, and visa-versa.

Thereafter, the instructions may be utilized to control graphics processing involving the texels, pixels, and/or primitives, etc., as indicated in operation 510. As mentioned earlier, this control may involve the texture module 301, the texture environment module 306, or any other desired component of the graphics pipeline.

As mentioned earlier, the texture module 301 need not necessarily discern between the instructions and the texture information. Further, the instruction and texture requests may be received in any desired order or iteration. Note flow lines 512 of FIG. 5. Further, more than one program may be operating at once.

In a system using the texture IDs described previously, it may be convenient to use one texture ID (i.e. texture ID 0) to refer to instructions stored as an instruction texture. Through programming or by hardware design, the texture ID which will be used for instruction textures can be configured to facilitate storing instructions by a host and retrieving instructions by the texture module 301. In the example mentioned previously where instructions passed down the pipeline from the host is 32 bits, it may be convenient to configure texture ID 0 to reference a 1-D, 32 bit texture. Further, it may be advantageous to configure texture ID 0 to use point sampling so that the texture filtering module 305 and/or any other components simply pass the instructions without processing (i.e. mapping, etc) of any sort.

It should be noted that the predetermined mode may be built into the hardware and reused each time an instruction is retrieved/handled. In the alternative, the mode or "state" may be reconfigured each time it is needed.

Figure 6:
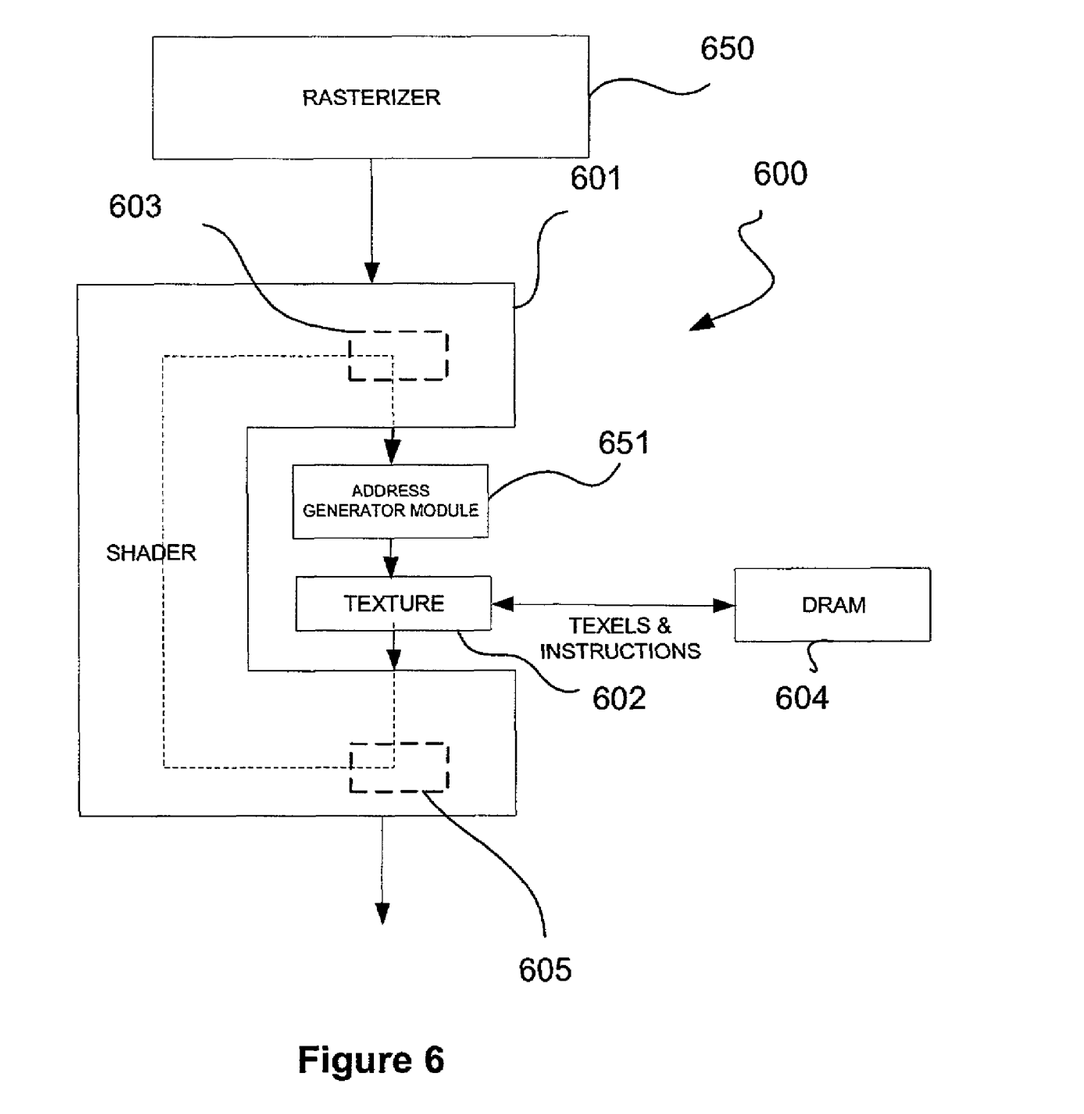
FIG. 6 illustrates a rasterization/texture module, in accordance with one embodiment.

FIG. 6 illustrates a rasterization/texture module 600, in accordance with one embodiment of a modern, high performance system as was described previously. Similar to the rasterization/texture module 300/301 of FIG. 3A, the present rasterization/texture module 600 may be implemented in the context of a graphics pipeline like that shown in prior art FIG. 1, or any other desired framework. Some exemplary differences between the systems of FIG. 3 and FIG. 6 include the addition of an address generator 651 and the manner in which texel data may be used by the texture and shader modules, as will now be set forth.

As shown, the address generator 651 is coupled to the texture module 602. Similar to the address generator of FIG. 3A, the address generator 651 is used to convert instruction requests into pseudo texture coordinates for the texture module 602. In this embodiment, these instruction requests can also include shader program requests from the shader 601. The pseudo texture coordinates are processed by the texture module 602 in the same manner as has been previously describe for texture coordinates in a conventional system. The resulting instruction texture data can be passed to the shader module 601 for execution as a shader program.

By this design, the shader module 601 may use the instructions to process the texels, pixels, and/or primitives, etc. Further, the shader module 601 may re-use the texels previously retrieved for looking up further texels. Further, the pixels may be recirculated by the shader module 601 for allowing multiple operations to be carried out thereon. It should be understood that processing logic 603 and 605 reside at an input stage and an output stage of the shader module 601 for this processing. Such re-use and recirculation may be carried out as a function of the instructions in a manner that will be set forth in greater detail during reference to FIG. 7.

When the texture referenced by a texture coordinate contains a shader program including instructions rather than color data, the texture is referred to as an "instruction texture". In one particular embodiment, the instruction texture can contain just shader program instructions. In this embodiment, the rasterization module 650 and shader module 601 generate requests for shader program instructions. An example shader module 601 may maintain a "program counter" indicating the current instruction required by the shader. In response to receiving the shader program instruction request with the program count for the desired instruction, the address generator module 651 creates pseudo texture coordinates which are processed in the same manner as normal texture coordinates as described previously. The resulting texel data may then be interpreted as shader program instructions by the shader module 601 for any subsequent graphics primitives that the shader module 601 processes.

In a system using the texture IDs described previously, it may be convenient to use one texture ID (i.e. texture ID 0) to always refer to a shader program stored as an instruction texture. Through programming or by hardware design, the texture ID which will be used for instruction textures can be configured to facilitate storing shader programs by a host and retrieving shader programs by the texture module 602.

For example, if the shader module 601 defines shader programs to be a sequence of 128 bit values, it may be convenient to configure texture ID 0 to refer to a 2-D texture that has a width of 4 texels and each texel to have 32 bits. Then, one element in shader program can be output by the texture module 602 by providing 4 texel coordinates to the texture module 602 which reference one row of the instruction texture. Using this scheme, texture ID 0 may also be configured to use point sampling so that the instruction texture data is not modified by the shader module 601.

It should be noted that, in this embodiment, the texture module 602 may not necessarily need to be modified to support the principles set forth herein. In this embodiment, the principles set forth herein are implemented primarily in the addition of the address generation module 651 which creates texture coordinates in the instruction texture, and in the shader module 601 which interprets the data from the texture module as program instructions rather than texture map data. Of course, any component of the desired environment may be modified to achieve similar benefits.

Figure 7:
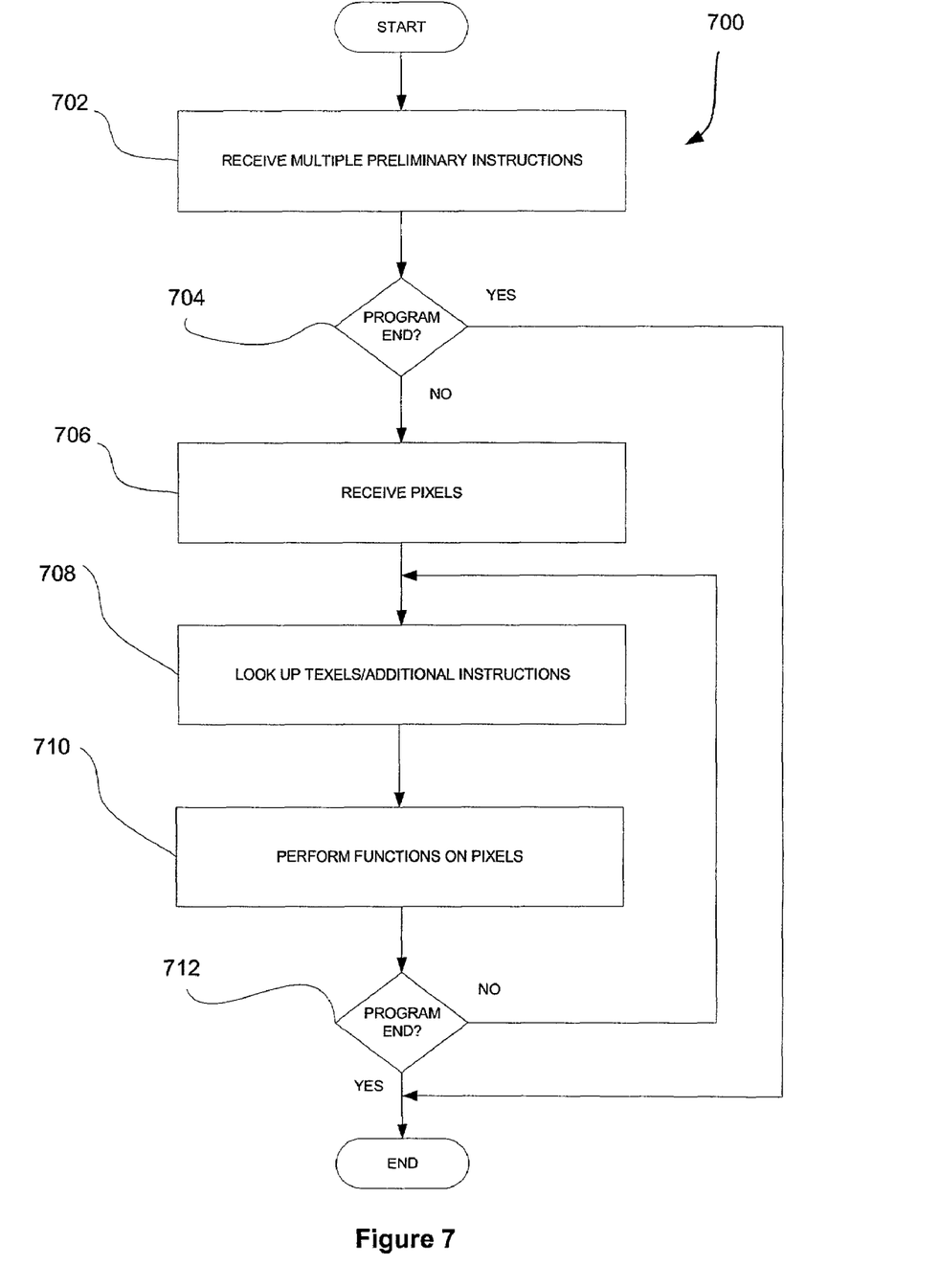
FIG. 7 illustrates a method for retrieving instructions from memory, in the context of the system set forth in FIG. 6.

FIG. 7 illustrates a method 700 for retrieving instructions from memory, in the context of the system set forth in FIG. 6. Initially, in operation 702, at least one preliminary instruction is received from a rasterizer at the shader module 601. Such use of the preliminary instruction is optionally employed for utilizing the input stage processing logic 603 of the shader module 601, thus avoiding any wasted cycles.

In response thereto, it is first determined in decision 704 as to whether the preliminary instruction is a terminate program instruction. If so, the current method 700 is immediately terminated. It should be noted that the preliminary instruction sometimes includes a terminate instruction when use of the shader module 601 is not desired.

If the preliminary instruction is not a terminate program instruction, pixels may be received from the rasterizer in operation 706. As mentioned earlier, such pixels may be those that overlap associated primitives. Thereafter, the texels and/or additional instructions are retrieved from the memory 604 utilizing the texture module 602 under the control of the shader module 601, which operates in accordance with the instructions. Note operation 708.

Various functions (i.e. shading calculations) are then performed on the pixels/texels received in operation 710 utilizing the shader module 601. In particular, the pixels may be shaded by mapping the texels thereto. Moreover, the texels may be used to look up additional texels, or may be involved in various other conventional pixel processing.

Next, in decision 712, it is determined whether the program is completed. Again, this may be indicated by the receipt of a terminate program instruction. If such is the case, the program is terminated. If not, however, operations 708 and 710 may be repeated based on the instructions in order to retrieve additional texels and/or instructions, and perform additional functions on the pixels utilizing the texels and/or instructions.

Figure 8:
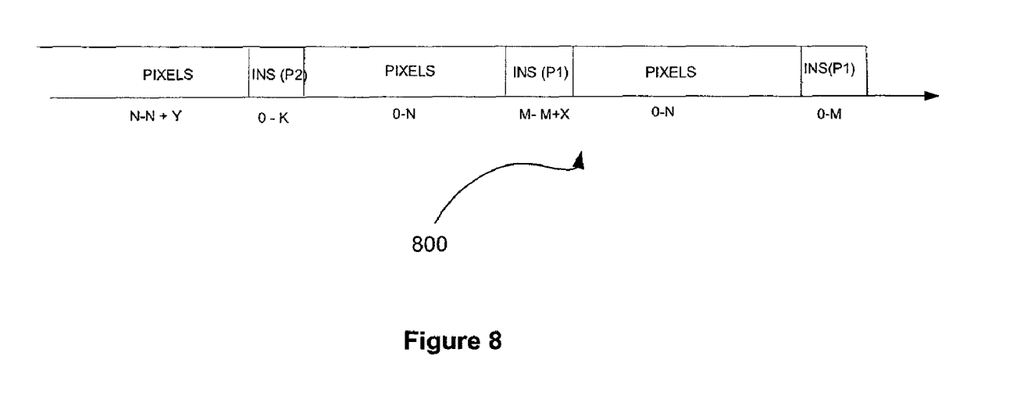
FIG. 8 illustrates a flow of instructions and pixels in the shader module of FIG. 6, in accordance with one embodiment.

FIG. 8 illustrates a flow 800 of instructions and pixels in the shader module 601, in accordance with one embodiment. As shown, a first set of instructions [0-M] of a first program (P1) are received for looking up either instructions and/or texels for operating on a first set of pixels [0-N]. Thereafter, an additional set of instructions [M-M+X] of the first program (P1) are received for looking up additional instructions and/or texels for further operating on the pixels [0-N] which may be recirculated in the shader module 601.

This may be continued as many times as desired per the program instructions of the first program (P1). When finished, the processed pixels may be outputted, and an additional set of instructions [0-K] of a second program (P2) and pixels [N-N+Y] may be processed in a similar manner.

As mentioned earlier, a complete instruction set may be received in response to the instruction request. In the alternative, a partial instruction set may be received in response to the instruction request. In such embodiment, partial instruction sets may be repeatedly retrieved. As yet another option, more data than is needed may be retrieved from memory, and any instructions not needed may be disregarded. This technique may be utilized to avoid having to retrieve instructions via multiple instruction requests. In yet another option, multiple instructions may be requested so that the instructions can be optimized to allow more efficient execution or use of resources.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for execution with a system including a tangible computer readable medium, the method for retrieving instructions from video memory utilizing a texture module in a graphics pipeline, comprising:
   (a) sending an instruction request to video memory, where a texture module in a graphics pipeline sends the instruction request to the video memory; and
   (b) receiving instructions from the video memory in response to the instruction request utilizing the texture module in the graphics pipeline;
   wherein an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;
   wherein a particular texture ID is used to refer to the instruction set that is stored as an instruction texture and the particular texture ID is configured to use point sampling so the instruction set is passed without any processing.

2. The method as recited in claim 1, and further comprising sending a texture request to video memory utilizing the texture module in the graphics pipeline.

3. The method as recited in claim 2, and further comprising receiving texture information from the video memory in response to the texture request utilizing the texture module in the graphics pipeline.

4. The method as recited in claim 3, wherein the instructions are adapted for controlling a texture environment module coupled to the texture module.

5. The method as recited in claim 4, wherein the instructions control the manner in which the texture environment module processes the texture information.

6. The method as recited in claim 3, and further comprising temporarily storing the instructions and the texture information in cache.

7. The method as recited in claim 6, wherein the cache is resident on the texture module.

8. The method as recited in claim 3, wherein each piece of texture information and each of the instructions are of a similar size in the video memory.

9. The method as recited in claim 3, and further comprising controlling the texture module utilizing a shader module coupled thereto.

10. The method as recited in claim 9, wherein the shader module controls the sending of the instruction request and the texture request by the texture module.

11. The method as recited in claim 9, wherein the shader module processes a plurality of pixels with the texture information based on the instructions.

12. The method as recited in claim 11, wherein the shader module is capable of reusing the texture information in order to request further texture information from the video memory.

13. The method as recited in claim 11, and further comprising ceasing the processing upon the receipt of a terminate instruction.

14. The method as recited in claim 1, wherein the video memory includes a frame buffer.

15. The method as recited in claim 14, wherein the video memory includes direct random access memory (DRAM).

16. The method as recited in claim 1, and further comprising receiving initial instructions from a rasterizer module coupled to the texture module.

17. The method as recited in claim 16, wherein the initial instructions control at least the sending of the instruction request by the texture module.

18. The method as recited in claim 1, wherein the instruction set includes a complete instruction set.

19. The method as recited in claim 1, wherein the instruction set includes a partial instruction set.

20. The method as recited in claim 19, and further comprising repeating (a)-(b) in accordance with the instructions.

21. The method as recited in claim 1, wherein (a)-(b) are carried out in accordance with the instructions received in response to the instruction request.

22. The method as recited in claim 1, wherein the texture module is adapted for operating in a plurality of different modes.

23. The method as recited in claim 22, wherein the instructions are received in a predetermined one or more of the different modes.

24. The method as recited in claim 1, wherein a rasterizer module coupled to the texture module sends the instruction request to an address generator, the address generator converts the instruction request into pseudo texture coordinates for the texture module, and the address generator outputs the pseudo texture coordinates such that resulting texel data is interpreted as the instruction set by the texture module.

25. The method as recited in claim 1, wherein the instruction set is received as an instruction texture that contains a shader program instead of color data and is referenced by a texture coordinate, the instruction texture utilizes texture ID 0 to refer to the shader program stored as the instruction texture, and the texture ID 0 is configured to use the point sampling so the instruction texture data that includes the shader program is not modified by a shader module.

26. A computer program product embodied on a non transitory computer readable medium, comprising:
(a) computer code for sending an instruction request to video memory, where a texture module in a graphics pipeline sends the instruction request to the video memory; and
(b) computer code for receiving instructions from the video memory in response to the instruction request utilizing the texture module in the graphics pipeline;
wherein the computer program product is operable such that an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;
wherein the computer program product is operable such that a particular texture ID is used to refer to the instruction set that is stored as an instruction texture and the particular texture ID is configured to use point sampling so the instruction set is passed without any processing.

27. A system including a tangible computer readable medium, comprising:
(a) means for sending an instruction request to video memory, where a texture module in a graphics pipeline sends the instruction request to the video memory; and
(b) means for receiving instructions from the video memory in response to the instruction request;
wherein the system is operable such that an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;
wherein the system is operable such that a particular texture ID is used to refer to the instruction set that is stored as an instruction texture and the particular texture ID is configured to use point sampling so the instruction set is passed without any processing.

28. A texture sub-system including a tangible computer readable medium, comprising:
(a) sending an instruction request to video memory, where a texture module sends the instruction request to the video memory; and
(b) receiving instructions from the video memory in response to the instruction request;
wherein the texture sub-system is operable such that an instruction set is received in response to the instruction request, the instruction set including a plurality of instructions such that the plurality of instructions are received at a single time for performing at least one optimization operation, the at least one optimization operation including at least one of combining at least a portion of the plurality of instructions, and deleting at least a portion of the plurality of instructions;
wherein the texture sub-system is operable such that a particular texture ID is used to refer to the instruction set that is stored as an instruction texture and the particular texture ID is configured to use point sampling so the instruction set is passed without any processing.

29. A data structure stored in a frame buffer of a graphics processor including a tangible computer readable medium, the data structure for allowing the retrieval of instructions, where a texture module coupled thereto sends an instruction request to video memory, the data structure comprising an instruction object stored in the frame buffer for being retrieved therefrom in response to the instruction request utilizing the texture module in the graphics processor;
wherein the data structure is utilized such that an instruction set is retrieved from the data structure in response to the instruction request, the instruction set including a plurality of instructions such that the plurality of instructions are retrieved at a single time for allowing at least one optimization operation to be performed, the at least one optimization operation including at least one of combining at least a portion of the plurality of instructions, modifying at least a portion of the plurality of instructions, and deleting at least a portion of the plurality of instructions;
wherein the data structure is utilized such that a particular texture ID is used to refer to the instruction set that is stored as an instruction texture and the particular texture ID is configured to use point sampling so the instruction set is passed without any processing.

30. A method for execution with a system including a tangible computer readable medium, the method for retrieving instructions from video memory, comprising:
(a) receiving a plurality of preliminary instructions from a rasterizer module utilizing a texture module coupled thereto;
(b) sending an instruction request to video memory, where the texture module sends the instruction request to the video memory;
(c) receiving additional instructions from the video memory in response to the instruction request utilizing the texture module;
(d) caching the additional instructions on the texture module;
(e) sending a texture request to video memory utilizing the texture module in accordance with the additional instructions;
(f) receiving texture information from the video memory in response to the texture request utilizing the texture module;
(g) caching the texture information on the texture module; and
(h) repeating (b)-(g) in accordance with the additional instructions;
wherein an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;

wherein a particular texture ID is used to refer to the instruction set that is stored as an instruction texture and the particular texture ID is configured to use point sampling so the instruction set is passed without any processing.

31. A method for execution with a system including a tangible computer readable medium, the method for retrieving instructions from video memory, comprising:
  (a) receiving a plurality of preliminary instructions from a rasterizer module utilizing a shader module coupled thereto;
  (b) sending an instruction request to video memory, where a texture module coupled to the shader module sends the instruction request to the video memory;
  (c) receiving additional instructions from the video memory in response to the instruction request utilizing the texture module;
  (d) caching the additional instructions on the texture module;
  (e) sending a texture request to video memory utilizing the texture module in accordance with the additional instructions;
  (f) receiving texture information from the video memory in response to the texture request utilizing the texture module;
  (g) caching the texture information on the texture module;
  (h) processing a plurality of pixels with the texture information utilizing the shader module in accordance with the additional instructions;
  (i) repeating (b)-(h) in accordance with the additional instructions; and
  (j) outputting the processed pixels upon receipt of additional instructions that include a terminate instruction;
    wherein an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;
    wherein a particular texture ID is used to refer to the instruction set that is stored as an instruction texture and the particular texture ID is configured to use point sampling so the instruction set is passed without any processing.

32. A method for execution with a system including a tangible computer readable medium, the method for retrieving instructions from video memory utilizing a cache in a graphics pipeline, comprising:
  sending an instruction request to video memory in a graphics pipeline, where a cache in the graphics pipeline sends the instruction request to the video memory; and
  receiving instructions from the video memory in response to the instruction request for storage in the cache in the graphics pipeline;
  wherein an instruction set is received in response to the instruction request, the instruction set including a plurality of instructions such that the plurality of instructions are received at a single time for performing at least one optimization operation, the at least one optimization operation including at least one of combining at least a portion of the plurality of instructions, modifying at least a portion of the plurality of instructions, and deleting at least a portion of the plurality of instructions;
  wherein a particular texture ID is used to refer to the instruction set that is stored as an instruction texture and the particular texture ID is configured to use point sampling so the instruction set is passed without any processing.

* * * * *